United States Patent
Vargis C et al.

(10) Patent No.: US 9,047,511 B1
(45) Date of Patent: Jun. 2, 2015

(54) DESCRIBING INTER-CHARACTER SPACING IN A FONT FILE

(71) Applicant: Amazon Technologies, Inc., Reno, NV (US)

(72) Inventors: Prannoy Vargis C, Chennai (IN); Tony Johri, Chennai (IN)

(73) Assignee: Amazon Technologies, Inc., Reno, NV (US)

( * ) Notice: Subject to any disclaimer, the term of this patent is extended or adjusted under 35 U.S.C. 154(b) by 50 days.

(21) Appl. No.: 13/895,223

(22) Filed: May 15, 2013

(51) Int. Cl.
 *G06K 9/32* (2006.01)
 *G06K 15/02* (2006.01)
 *H04N 1/40* (2006.01)
 *G06T 11/00* (2006.01)
 *G06K 9/00* (2006.01)

(52) U.S. Cl.
 CPC .................................... *G06K 9/0053* (2013.01)

(58) Field of Classification Search
 CPC ..... G06K 15/02; G06K 9/72; G06K 15/1856; G06K 15/1842; G06K 15/181; G06K 15/1848; G06K 15/1827; G06K 9/00463; G06K 9/0053; G06K 9/00456; G09G 5/28; G09G 5/225; G09G 5/234; A01B 12/006
 USPC ......... 382/100, 155, 162, 168, 173, 181, 232, 382/254, 203, 276, 301, 309, 312; 358/1.11, 1.1, 1.12, 1.9, 462; 345/467, 345/469, 471, 468, 469.1, 472, 470, 472.3, 345/613, 418, 472.1, 472.2, 537, 589, 156, 345/440, 442, 473, 501, 530, 549, 557, 591, 345/601, 629, 661, 672, 694, 947
 See application file for complete search history.

(56) References Cited

U.S. PATENT DOCUMENTS

| | | | | |
|---|---|---|---|---|
| 5,590,260 A * | 12/1996 | Morse et al. | .................. | 345/467 |
| 5,689,585 A * | 11/1997 | Bloomberg et al. | .......... | 382/229 |
| 5,771,034 A * | 6/1998 | Gibson | ......................... | 345/471 |
| 6,236,390 B1 * | 5/2001 | Hitchcock | ..................... | 345/694 |
| 7,705,848 B2 * | 4/2010 | Bronstein | ..................... | 345/442 |
| 8,687,004 B2 * | 4/2014 | Gonzalez et al. | ............. | 345/467 |

* cited by examiner

*Primary Examiner* — Sheela Chawan
(74) *Attorney, Agent, or Firm* — Lowenstein Sandler LLP

(57) ABSTRACT

A method of describing inter-character spacing in a font file. The method includes receiving a plurality of glyphs associated with textual content, and determining a corresponding advance value for each of the plurality of glyphs, the corresponding advance value being based on a distance between a respective glyph and a next glyph following the respective glyph. The method further includes storing the corresponding advance value for each of the plurality of glyphs in an advance table of the font file, and generating an electronic document for the textual content based on the plurality of glyphs and the font file.

21 Claims, 7 Drawing Sheets

DESCRIBING INTER-CHARACTER SPACING IN A FONT FILE

BACKGROUND

A large and growing population of users enjoys entertainment through the consumption of digital media items, such as music, movies, images, electronic books and so on. Users employ various electronic devices to consume such media items. Among these electronic devices are electronic book readers, cellular telephones, personal digital assistants (PDAs), portable media players, tablet computers, netbooks and the like.

Converting the content of a physical book into a digital format may be a time-consuming process. Further, information, such as the original fonts, may be lost in the conversion process, resulting in digital content that does not fully represent the content of the physical book.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

DETAILED DESCRIPTION

Embodiments of the present disclosure provide a method for describing inter-character spacing in a font file for the text content of a physical book when converting the physical book into a digital format (e.g., an electronic book or e-book). The method includes imaging a page of the physical book and determining fonts of characters in the resulting image to retain the original fonts of the text content of the physical book in the digital representation. The determined font of a character may include a shape of the character, a font size, a font typeface and other font characteristics of the character. One font characteristic is inter-character spacing between two characters occurring together in the text. Inter-character spacing is a distance between the right boundary of the first character and the left boundary of the second character. Embodiments of the present disclosure describe inter-character spacing in the font file in an efficient manner that results in a reduced size of the font file, improved performance in rendering the font, and support of font file content across various platforms.

Figure 1:
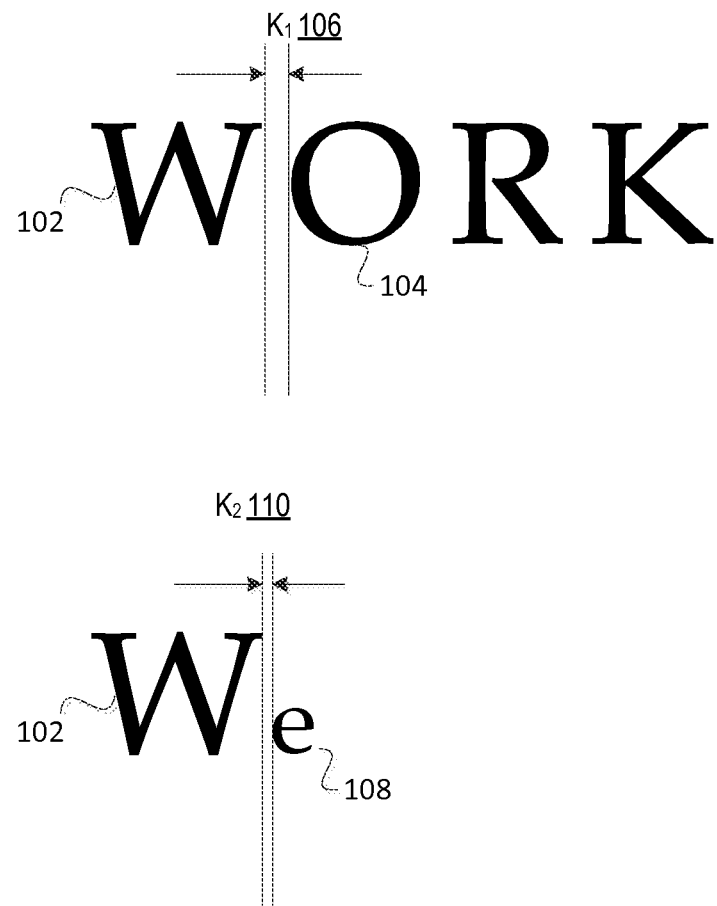
FIG. 1 illustrates examples of inter-character spacing for a character in two different occurrences of the character in the text.

FIG. 1 illustrates examples of inter-character spacing for character "W" 102 in two different occurrences in the text. Inter-character spacing can be defined using a kerning metric. A kerning metric describes adjustment to the width of the character when the character is followed by another character in the text. In FIG. 1, inter-character spacing between character 102 and character 104 is defined by kerning 106. Inter-character spacing between character 102 and character 108 is defined by kerning 110. As shown, kerning values 106 and 108 are different. This difference may, for example, be due to different formatting used for two occurrences as intended by the original author or designer of the physical book.

Conventionally, the width of a character and its kerning value are stored in two different tables in a font file. The width is usually defined as an advance value that specifies the distance the cursor should move from the left boundary of the character after the character is drawn. This advance value is stored in the HMTX table of the font file. The kerning value is stored in the kerning table. An entry in the kerning table identifies each character in a pair of characters occurring together in the text, and a kerning value for this pair of characters. When the text content includes a large number of characters, the kerning table grows exponentially to be able to cover various combinations of characters. This impacts the size of the font file and performance of the rendering engine, which should perform a look-up in the kerning table for each combination of two characters. In addition, some browsers have limited support for kerning, which negatively impacts web-based rendering of e-books that have fonts specifying kerning.

Embodiments of the present disclosure address the above deficiencies of the conventional font mechanisms by eliminating the use of the kerning table. In particular, when a font of a character is determined, an advance value of a character is calculated using the width of the character and a kerning value of the character, and a new entry is added to the advance table to record this advance value. For example, given character "a" having width $w_a$ and character "b" having width $w_b$ which occur consecutively with inter-character spacing defined by a kerning adjustment value "k," an entry for a new character "$a_2$" is created in the advance table with advance value $w_a$+k, where the new character "$a_2$" may have the same contour as character "a."

Figure 2:
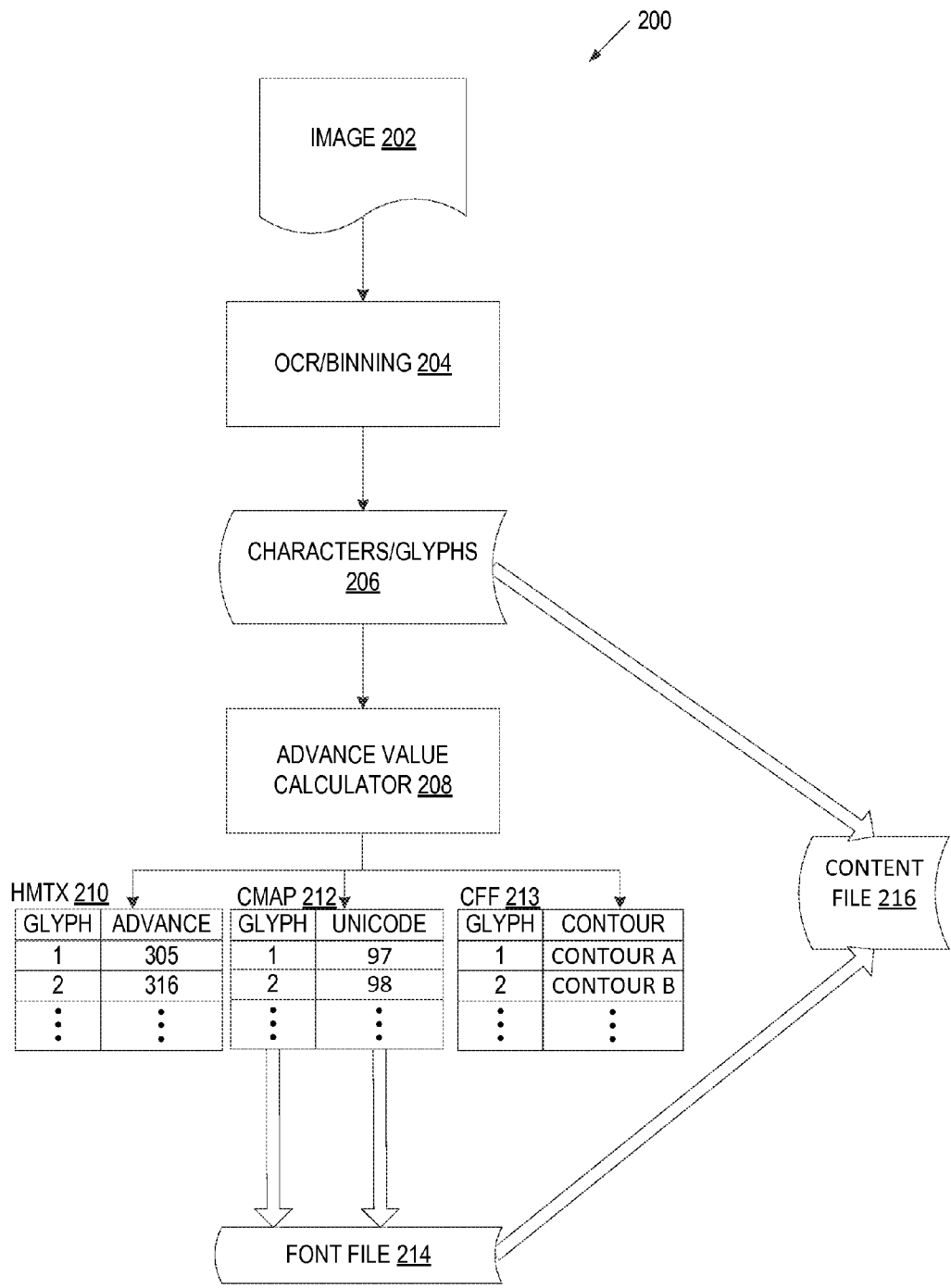
FIG. 2 illustrates operation of an example font subsystem in accordance with some embodiments of the present disclosure.

FIG. 2 illustrates operation of an example font subsystem 200 in accordance with some embodiments of the present disclosure. The font subsystem 200 creates fonts for an electronic work. Examples of electronic works include, and are not limited to, electronic books (e-books), electronic magazines, electronic newspapers, electronic journals, electronic comic books, etc. An electronic work may include a single work or a collection of works. For example, an electronic work may include a single book, or an anthology.

Image 202 is an image of a portion of a printed publication such as a physical book. The image 202 may be generated by imaging a physical page of a book or a portion thereof. For example, the image 202 may be generated using a scanner or a camera.

In one embodiment, the image 202 is converted into a vector image. The vector image may be a set of values defining a plurality of vectors or lines. In one embodiment, the vector image is a set of values defining a plurality of Bezier curves. It is to be appreciated that, as used herein, the term "line" and the term "curve" both includes straight lines and straight line segments as well as lines and segments with non-zero curvature. The curves may be defined as a mathematical formula or parameters to be rendered using a predetermined formula. For example, the curves may be defined by a Bezier curve or Bezier control points to be used in rendering a Bezier curve.

In one embodiment, the vector image is segmented into character blocks, each character block being a portion of the image containing a glyph representing a character. A glyph representing a character may include a plurality of shapes, each referable to as a glyph. For example, a glyph may represent the character "η", whereas both the "n" and the tilde "~" above the "n" may be considered glyphs.

In one embodiment, the vector image is processed by an optical character recognition (OCR) subsystem 204 to determine characters corresponding to the glyphs. The OCR subsystem 204 may be any type of computing device or multiple computing devices, such as a desktop computer system, a server, a supercomputer, a notebook computer, a tablet computer, a smart phone, and the like. The OCR subsystem 204 can include software modules, hardware modules, or a combination thereof. The OCR subsystem 204 may analyze shapes of the glyphs and make "best guesses" at characters using look-up tables. A character may correspond to one or more glyphs.

In another embodiment, the image 202 is segmented into character blocks without vectorization. Then, each of the character blocks is analyzed to determine the character corresponding to and represented by the glyph in the character block, e.g., which character the glyph represents. A character may be a letter, such as "a", "b", "c", "π", "Ж" or "ъ". A character may be a ligature corresponding to more than one letter, such as "æ" or "ᴂ". A character may be a symbol, such as "$", "#" or "¶". A character may represent other typographical shapes than those mentioned above.

In yet another embodiment, the image 202 is processed without determining what characters correspond to the glyphs identified in the image 202. In particular, a binning process can be used to identify glyphs with similar shapes, where each bin can include a group of glyphs with matching shapes or glyphs with shapes deviating from each other by a small percentage (e.g., not more than 5 percent). In one embodiment, the shape of a glyph is represented using a signature vector (a collection of values indicative of shape and appearance characteristics of the glyph), and glyphs are binned based on similarities between their signatures. Each bin can be assigned a distinct shape identifier (ID) and all glyphs in the bin can be associated with the shape ID assigned to that bin.

Although many of the embodiments described below are discussed and illustrated with respect to the Roman alphabet, it is to be appreciated that other character sets may be used, including but not limited to Greek, Hebrew, Cyrillic, Arabic and Asian character sets such as hiragana, katakana and kanji.

The determined characters or glyphs 206 may be stored as an xml file, unformatted text file or any other type of file. A character or glyph may be stored as a numerical code representing a corresponding glyph. The numerical code may be an ASCII (American Standard Code for Information Interchange) or a Unicode code point. In one embodiment, the Private Use Area of Unicode (a range of Unicode code points not assigned by Unicode Consortium) is used to assign Unicode code points to the glyphs identified in the image 202. The character/glyph file 206 may also include coordinates for the glyphs. When the character file 206 is created by the OCR subsystem 204, the file 206 may include OCR boundary information ("bounds") that specifies the rectangular coordinates for the glyphs representing the characters.

Further, each glyph is analyzed to determine the font of the glyph. In one embodiment, a signature vector of each glyph is compared to those in a database of signature vectors for glyphs of various fonts. In one embodiment, the signature vector is only compared to the signature vectors in the database having the same character or shape ID as the character or shape ID corresponding to the glyph. The font may be selected as the font in the database having a signature vector which most closely matches the signature vector of the glyph. The signature vector may be determined as that which most closely matches the signature vector of the glyph using a Euclidian distance metric, a 1-distance metric or other metric. The determined font of the glyph may include a font size and a font typeface.

In addition, other font characteristics of each glyph can be determined, including the width of each glyph and kerning adjustment for each pair of glyphs occurring together in the image 202. The font subsystem 200 may include an advance value calculator 208 that determines the width and kerning adjustment of each glyph. The width of glyph G can be defined based on character C represented by glyph G, and the font size and the font typeface of glyph G. For example, a dictionary can be maintained that stores the width of each character of a particular font size and font typeface, and the advance value calculator 208 can search the dictionary to find the width of matching character C having a matching font size and font typeface. Alternatively, the width of glyph G can be determined from the image 202.

Kerning adjustment can be defined by a distance between glyph G and next glyph G' following glyph G in the image 202. In one embodiment, the advance value calculator 208 determines this distance by comparing OCR bounds of both glyphs and determining the distance from the right boundary of glyph G to the left boundary of glyph G'. Alternatively, the distance can be determined from the image 202. The advance value calculator 208 can then determine an advance value A for glyph G by adding the kerning adjustment to the width of glyph G.

Further, the advance value calculator 208 can determine whether an advance table (e.g., HMTX table 210) in the font file already includes an entry for a previously occurred glyph that represents character C (or has shape ID X) and has advance value A. If so, the advance value calculator 208 can associate glyph G in the characters/glyphs file 206 with the numeric code of the previously occurred glyph. If the advance table does not include an entry for a matching glyph, the advance value calculator 208 can assign a new numeric code U to the glyph G, add an entry with glyph G and advance value A to the advance table (e.g., HMTX table 210), add an entry with assigned code U and glyph G to the mapping table (e.g., CMAP table 212), and associate glyph G in the character file 206 with numeric code U. The advance value calculator 208 can also add an entry to a contour table (e.g., CFF table 213) of the font file, where the entry includes glyph G and contour definition for glyph G. A glyph can be represented in the above tables via a unique identifier, which can be generated sequentially, randomly or in any other way. A contour definition can refer to a set of instructions for drawing the shape of a glyph.

In one embodiment, rather than adding new contour definition for glyph G, a reference to existing contour definition associated with shape ID X is added to the contour table to reuse duplicated contours. For example, if the font file is an OpenType font file, a subroutine for contour definition of shape ID X is created in the contour table (e.g., CFF table 213) of the font file, and a reference to this subroutine is specified in the contour table each time a new entry for a glyph having shape ID X is added to the contour table, thus reducing the size of the contour table. In another example, if the font file is a TrueType font file, the first glyph having shape ID X is defined as a simple glyph in the glyph table of the font file, and each subsequent glyph having shape ID X is defined as a compound glyph including the above simple glyph as a component, thus reducing the size of the glyph table.

Accordingly, the resulting font file 214 associated with image 202 includes the advance table (e.g., HMTX table 210) in a modified form but does not include the kerning table, thereby significantly reducing the size of the font file 214. In some embodiments, multiple font files 214 are created for image 202 (e.g., a separate font file 214 for each font typeface or a separate font file 214 for a subset of tables) using the inter-character spacing approach discussed herein.

The character file 206 and the font file(s) 214 may be combined into content file 216. The content file 216 may be a formatted text file such as an RTF (Rich Text Format) file, an HTML file, a TeX file or another formatted text file type. A text rendering engine may be used to render the content file 216 on an electronic device (e.g., an electronic book reader or e-reader). By eliminating the kernel table from the font file 214, the performance of the text rendering engine is improved as it no longer needs to perform a separate look-up operation to determine a kerning metric for each glyph. In addition, for web-based rendering of the content file 216, any browser can be used including those browsers that do not support kerning.

In addition or alternatively, the font subsystem 200 applies the mechanism described herein to modify an existing font file that was previously created with the kerning table and in the advance table in the original form. As discussed above, the advance table in the original form specifies the width of a glyph, and the kerning table identifies each glyph in a pair of characters occurring together in the text and a kerning value for this pair of glyphs. The font subsystem 200 can use the advance value calculator 208 to determine an advance value for each glyph by adding a kerning adjustment of the glyph from the kerning table to the width of that glyph as specified in the advance table. The advance value calculator 208 can then re-create the advance table (e.g., HMTX table 210), the mapping table (e.g., CMAP table 212), and the contour table (e.g., CFF table 213) as discussed above. In addition, the advance value calculator 208 can reuse duplicate contours in the contour table as discussed above. As a result, the modified font file will include the advance table (e.g., HMTX table 210) in a revised form but will not include the kerning table, thereby significantly reducing the size of the font file and improving performance of the text rendering engine because it will no longer need to perform a separate look-up operation to determine a kerning metric for each glyph. In addition, the modified font file will be compatible with browsers that do not support kerning.

Figure 3:
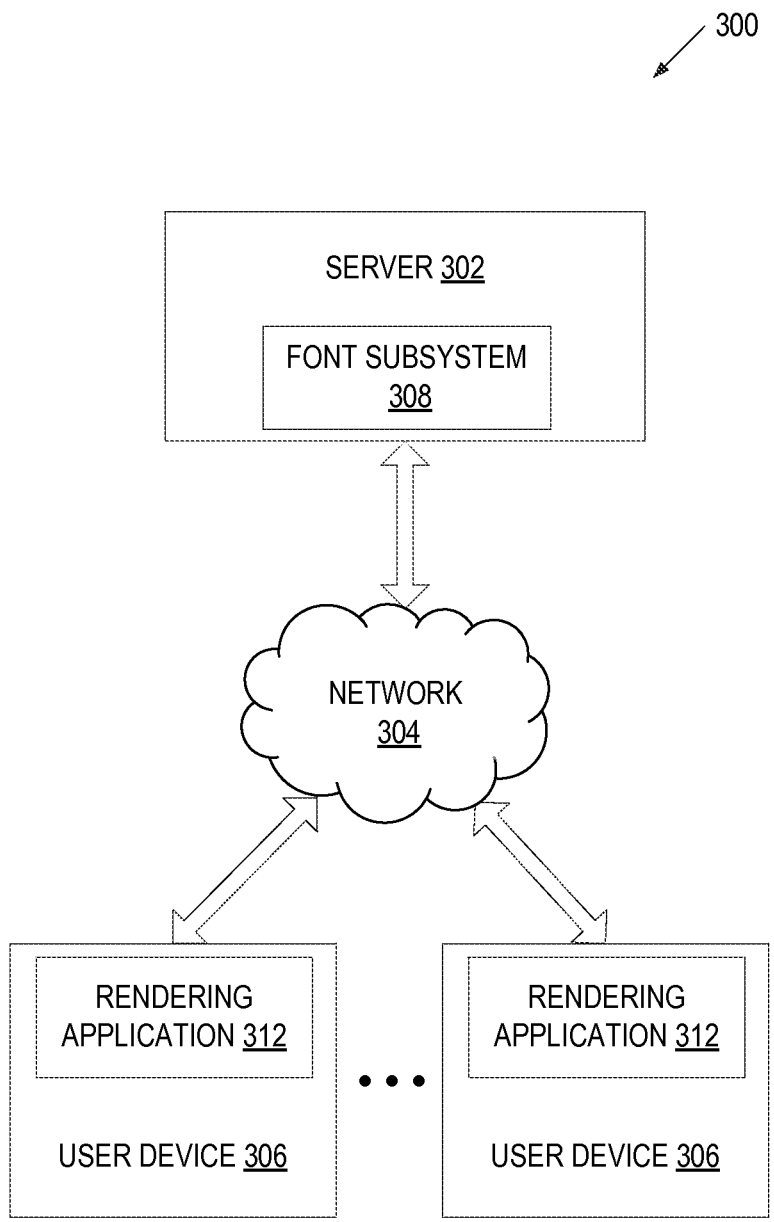
FIG. 3 illustrates an example network architecture 300 in which embodiments of the present disclosure can operate.

FIG. 3 illustrates an example network architecture 300 in which embodiments of the present disclosure can operate. The network architecture 300 may include a server 302 and multiple user devices 306 coupled to the server 302 via a network 304 (e.g., a public network such as the Internet, a private network such as a local area network (LAN), or a virtual private network (VPN)).

The user devices 306 are variously configured with different functionality to enable consumption of electronic documents such as e-books, newspaper articles, journal articles, magazine articles, and any other electronic documents including textual content. The user devices 306 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The server 302 provides electronic documents, upgrades, and/or other information to the user devices 306 registered with the server 302 via the network 304. The server 302 also receives various requests, instructions and other data from the user devices 306 via the network 304. The server 302 may include one or more machines (e.g., one or more server computer systems, routers, gateways) that have processing and storage capabilities to provide the above functionality.

Communication between the server 302 and a user device 306 may be enabled via any communication infrastructure. One example of such an infrastructure includes a combination of a wide area network (WAN) or a VPN and wireless infrastructure, which allows a user to use the user device 306 to purchase items and consume items without being tethered to the server 302 via hardwired links. The wireless infrastructure may be provided by a wireless carrier system that can be implemented using various data processing equipment, communication towers, etc. Alternatively, or in addition, the wireless carrier system may rely on satellite technology to exchange information with the user device 306. Yet alternatively, or in combination, the wireless infrastructure may be provided by an access point (e.g., WiFi access point) provider system.

The server 302 can facilitate conversion of printed publications received from various sources (e.g., book publishers, newspapers, etc.) into a device-readable format. The server 302 may include a font subsystem 308 to retain the original fonts of a printed publication in the digital representation. The font subsystem 308 determines text characters of the printed publication and creates a font file of a reduced size for the text characters by eliminating the use of the kerning table and by reflecting kerning in the advance table of the font file instead. The font subsystem 308 creates an electronic document (e.g., e-book) containing the determined text characters and the font file(s). In addition or alternatively, the font subsystem 308 can reduce the size of an existing font file containing a kerning table by removing the kerning table from the font file and reflecting kerning adjustments in the advance table instead.

The user device 306 includes a rendering application 312 that may be a web browser that receives the electronic document from the server 302 via the public network (e.g., Internet) and reflows the electronic document to render the text content on the user device 306. Alternatively, the rendering application 312 may not be a web browser but rather a designated rendering application (e.g., a mobile application) for rendering the electronic document on the user device 306.

Figure 4:
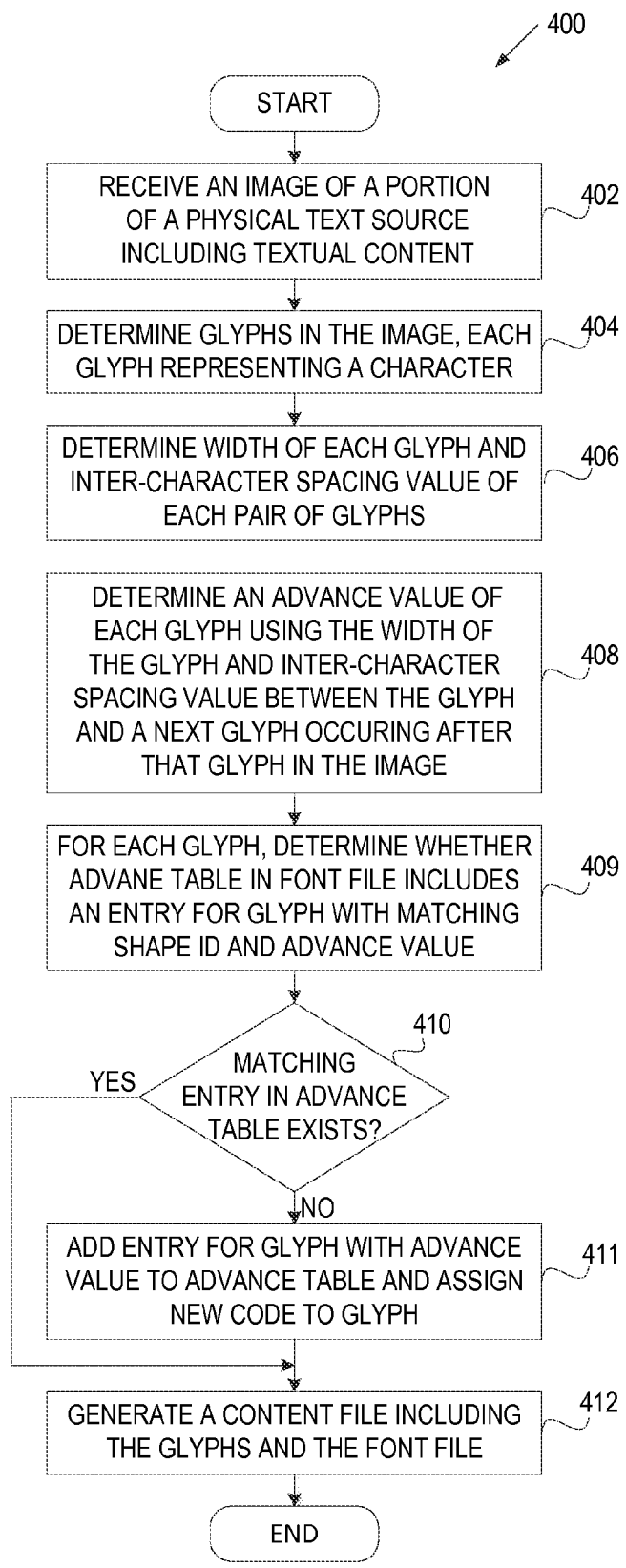
FIG. 4 is a flow diagram of one embodiment of a method for describing inter-character spacing in a font file.

FIG. 4 is a flow diagram of one embodiment of a method 400 for describing inter-character spacing in a font file. The method 400 is performed by processing logic that may comprise hardware (circuitry, dedicated logic, etc.), software (such as is run on a general purpose computer system or a dedicated machine), or a combination of both. In one embodiment, the method is performed by a server (e.g., server 302 of FIG. 3).

Referring to FIG. 4, method 400 begins with the server receiving an image of a portion of a physical text source including textual content (block 402). The physical text source may be a printed publication such as a physical book. The image may be generated by imaging a physical page of a book or a portion thereof. For example, the image may be generated using a scanner or a camera. The image may be received by, for example, downloading the image from a remote server or accessing the image from a local memory.

At block 404, the server determines glyphs in the image. In one embodiment, server determines the glyphs by converting the image into a vector image and segmenting the vector image into character blocks, where each character block is a portion of the image containing a glyph representing a character. The characters can be determined by performing an OCR process on the vector image. Alternatively, the image can be segmented into character blocks without vectorization, and each of the character blocks can be analyzed to determine the character corresponding to and represented by the glyph in the character block. Yet alternatively, the server does not determine what characters correspond to the glyphs identified in the image. Rather, the server uses a binning process to identify glyphs with similar shapes. Each bin is assigned a distinct shape identifier (ID) and all glyphs in the bin are associated with the shape ID assigned to that bin.

The determined characters or glyphs can be stored as an xml file, unformatted text file or any other type of file. A character or glyph may be stored as a numerical code such as a Unicode code point (e.g., a Unicode code point in the Private Use Area of Unicode).

Further, the server can analyze each glyph to determine the font of the glyph. As part of this process, the server can determine the width of each glyph and inter-character spacing (e.g., kerning adjustment) for each pair of glyphs occurring together in the image (block 406). The width of glyph G can be determined from the image or based on character C represented by glyph G, and the font size and the font typeface of glyph G. Kerning adjustment can be defined by a distance between glyph G and next glyph G' following glyph G in the image. At block 408, the server determines an advance value A for glyph G by adding the kerning adjustment to the width of glyph G.

Next, the server adds advance values of the glyphs to the font file without separately including kerning values of the glyphs in the font file. In one embodiment, the server adds advance values to the advance table of the font file and does not create or include the kerning table in the font file. In some implementations, for each glyph having shape ID X and advance value A, the server first determines whether the advance table already includes an entry for a glyph with shape ID X and advance value A (block 409). If the advance table includes a matching entry (block 410), the server does not add an entry for this glyph to the advance table. If the advance table does not include a matching entry (block 410), the server adds an entry for the glyph to the advance table, and assigns a new code to this glyph (block 411).

At block 412, the server creates a content file (e.g., a reflowable content file) using the determined characters or glyphs and the font file(s). The reflowable content file may include a series of numbers representing the determined characters or glyphs and the associated fonts, which when rendered, represent the content of the physical text source. The reflowable content file may include a series of numbers representing lines or curves (e.g., Bezier curves) which, when rendered, represent the content of the physical text source. In one embodiment, the reflowable content file is a Topaz file.

The reflowable content file may be a formatted text file. For example, the reflowable content file may be an RTF (Rich Text Format) file or a TeX file. The reflowable content file may be a mark-up file, such as an HTML (HyperText Markup Language) file or an XML (eXtensible Markup Language) file. The reflowable content file may be an ebook file, such as an MOBI file, a PRC file or an KF8 (Kindle Format 8) file.

Figure 5A:
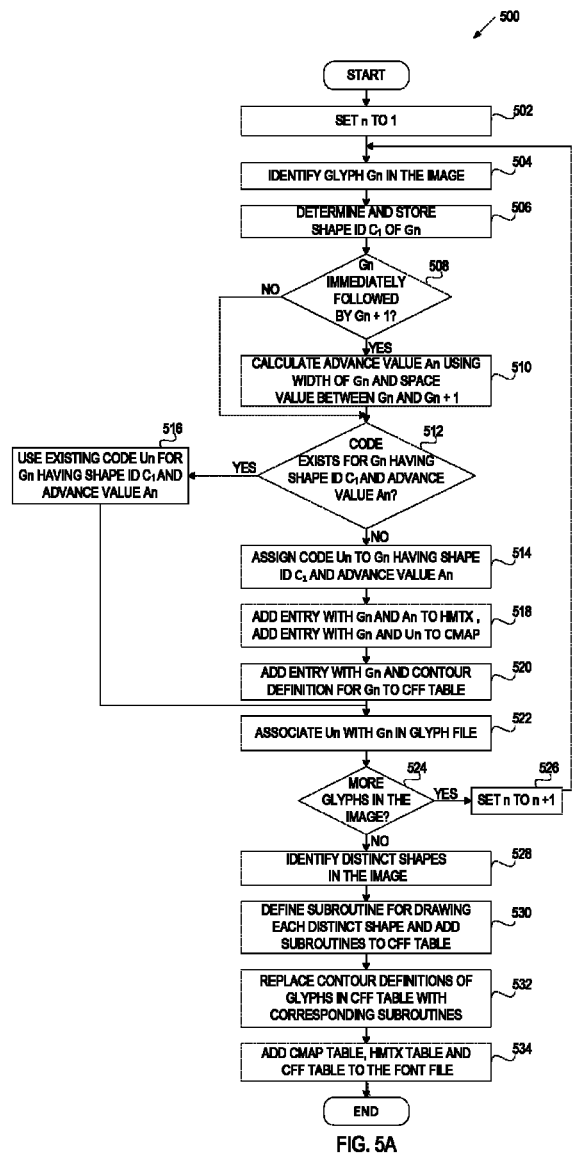
FIG. 5A is a flow diagram of one embodiment of a method for adding inter-character spacing to an OTF/CFF font file.

FIG. 5A is a flow diagram of one embodiment of a method 500 for adding inter-character spacing to an OTF/CFF font file. The method 500 is performed by processing logic that may comprise hardware (circuitry, dedicated logic, etc.), software (such as is run on a general purpose computer system or a dedicated machine), or a combination of both. In one embodiment, the method is performed by a server (e.g., server 302 of FIG. 3).

Referring to FIG. 5A, method 500 begins with setting n to 1 to start processing the first glyph in the image (block 502). At block 504, the server identifies the first glyph Gn in the image. At block 506, the server determines shape ID C1 of glyph Gn (e.g., using binning) and stores glyph Gn having shape ID C1 in the glyph file.

At block 508, the server determines whether glyph Gn is immediately followed by another glyph Gn+1 in the image. For example, the server can make this determination by deciding whether there is another glyph within a predefined distance from glyph Gn. If not, the server sets advance value An to the width of the glyph Gn, and method 500 proceeds to block 512. If so, the server calculates advance value An using the width of Gn and an inter-character space value between glyph Gn and glyph Gn+1 (block 510), and method 500 proceeds to block 512.

At block 512, the server determines whether a Unicode code point already exists for a previously processed glyph that has shape ID C1 and the same advance value An (e.g., by searching the HMTX table). If so, the server uses the existing Unicode code point Un for glyph Gn (block 516) and proceeds to block 522. If not, the server assigns a new Unicode code point Un to glyph Gn having shape ID C1 and advance value An (block 514), adds an entry with glyph Gn and advance value An to the HMTX table of the font file and adds an entry with glyph Gn and assigned code Un to the CMAP table (block 518), In addition, the server adds an entry with glyph Gn and contour definition for glyph Gn to the CFF table of the font table (block 520), and proceeds to block 522. As discussed above, glyph Gn can be represented in the above table via a unique identifier.

At block 522, the server associates Unicode code point Un with glyph Gn having shape ID C1 in the glyph file. In one embodiment, the association is performed by replacing glyph Gn with Unicode code point Un in the glyph file. At block 524, the server determines if all glyphs in the image file have been processed. If there are glyphs that have not been processed, the server sets n to n+1 to move to the next glyph in the image (block 526) and returns to block 504.

If all the glyphs in the image have been processed, the server identifies distinct shapes in the image using shape IDs (block 528), defines a subroutine for drawing each glyph having a distinct shape ID, adds the resulting subroutines to the CFF table (block 530), and replaces contour definitions of glyphs in the CFF table with references to the corresponding subroutines (block 532). At block 534, the server adds the CMAP table, the HMTX table and the CFF table to the OTF/CFF font file.

Figure 5B:
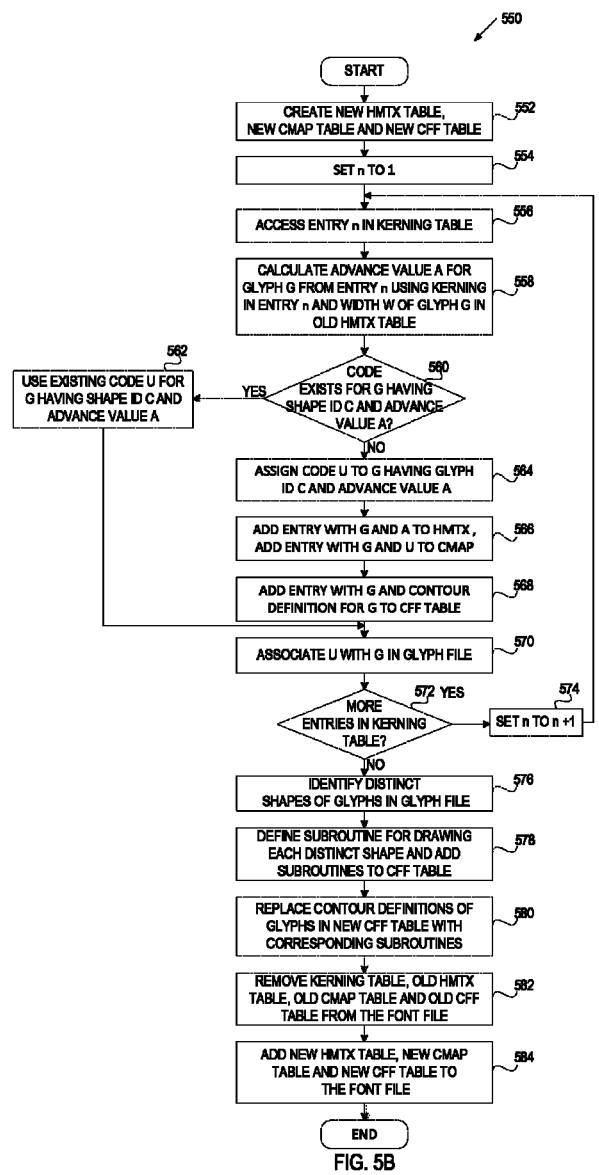
FIG. 5B is a flow diagram of one embodiment of a method for modifying an OTF/CFF font file having a kerning table.

FIG. 5B is a flow diagram of one embodiment of a method 550 for modifying an OTF/CFF font file having a kerning table. The method 550 is performed by processing logic that may comprise hardware (circuitry, dedicated logic, etc.), software (such as is run on a general purpose computer system or a dedicated machine), or a combination of both. In one embodiment, the method is performed by a server (e.g., server 302 of FIG. 3).

Referring to FIG. 5B, method 550 begins with the server receiving an existing content file (e.g., a reflowable content file previously created for an image of a printed publication). The existing content file includes a glyph file that specifies glyphs identified in the image, and a font file that defines fonts for the glyphs. The font file can contain various tables, including a kerning table, an HMTX table (referred to herein as "old HMTX table"), a CMAP table (referred to herein as "old CMAP table") and a CFF table (referred to herein as "old CFF table").

In one embodiment, the server creates a new HMTX table, a new CMAP table and a new CFF table (blocks 552), and sets n to 1 to start processing entries in the kerning table (block 554). At block 556, the server accesses entry n in the kerning table. At block 558, the server calculates advance value A for glyph G from entry n of the kerning table using a kerning value in entry n and the width of glyph G in the old HMTX table.

At block 560, the server identifies shape ID C of glyph G (e.g. using the glyph file) and determines whether a Unicode code point already exists for a previously processed glyph that has shape ID C and the same advance value A (e.g., by searching the HMTX table). If so, the server uses the existing Unicode code point U for glyph G (block 562) and proceeds to block 570. If not, the server assigns a new Unicode code point U to glyph G having shape ID C and advance value A (block 564), adds an entry with glyph G and advance value A to the new HMTX table and adds an entry with glyph G and assigned code U to the new CMAP table (block 566), In addition, the server adds an entry with glyph G and contour definition for glyph G to the new CFF table (block 568), and proceeds to block 570.

At block 570, the server associates Unicode code point U with glyph G in the glyph file. In one embodiment, the association is performed by replacing glyph G with Unicode code point U in the glyph file.

At block 572, the server determines if all entries in the kerning table have been processed. If there are entries that have not been processed, the server sets n to n+1 to move to the next entry in the kerning table (block 574) and returns to block 556.

If all the entries in the kerning table have been processed, the server identifies distinct shapes of glyphs in the glyph file using shape IDs (block 576), defines a subroutine for drawing each distinct shape and adds the resulting subroutines to the CFF table (block 530), and replaces contour definitions of glyphs in the CFF table with references to the corresponding subroutines (block 580). At block 582, the server removes the kerning table, the old CMAP table, the old HMTX table and the old CFF table from the OTF/CFF font file. At block 584, the server adds the new CMAP table, the new HMTX table and the new CFF table to the OTF/CFF font file. The resulting OTF/CFF font file no longer includes the kerning table.

Figure 6:
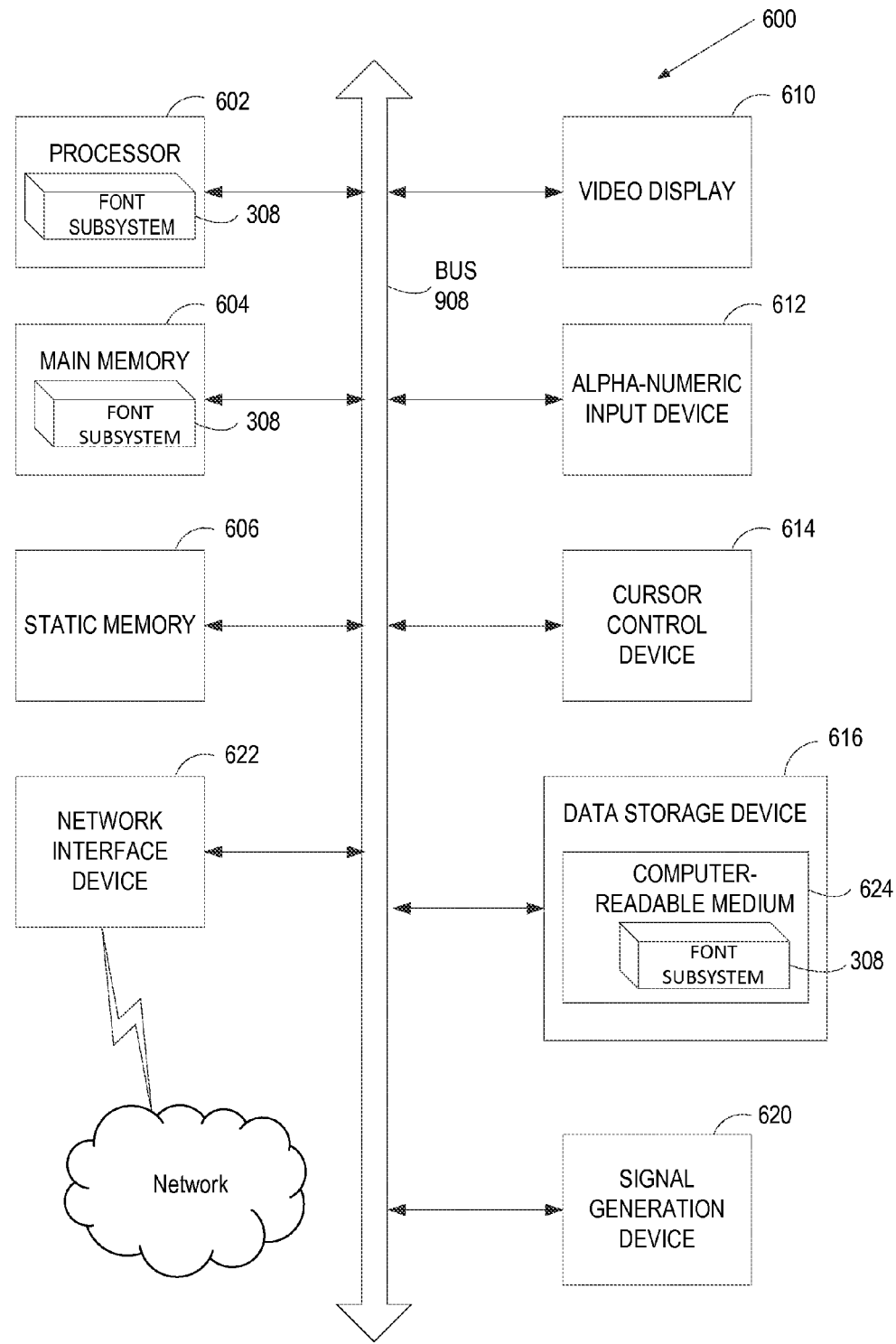
FIG. 6 illustrates an example server implementing a font subsystem in accordance with some embodiments of the disclosure.

FIG. 6 illustrates an example server in the form of a computer system 600 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 606.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 of the font subsystem 308 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

A drive unit 616 may include a computer-readable medium 624 on which is stored one or more sets of instructions (e.g., instructions 626 of the font subsystem 308) embodying any one or more of the methodologies or functions described herein. The instructions 626 of the font subsystem 308 may also reside, completely or at least partially, within the main memory 604 and/or within the processor 602 during execution thereof by the computer system 600, the main memory 604 and the processor 602 also constituting computer-readable media. The instructions 626 of the font subsystem 308 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "creating", "notifying", "allowing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a processor, an image of at least a portion of a source document comprising textual content;
identifying, by the processor, a plurality of glyphs in the image;
for each glyph of the plurality of glyphs,
determining, by the processor, a width of a respective glyph;
determining, by the processor, an advance value for the respective glyph using the width of the respective glyph and the space between the respective glyph and a next glyph following the respective glyph in the image;
adding, by the processor, an entry for the respective glyph to an advance table of a font file, wherein the entry in the advance table comprises a glyph identifier of the respective glyph and the advance value of the respective glyph; and
adding, by the processor, an entry for the respective glyph to a mapping table and a contour table of the font file, wherein the entry in the mapping table comprises the glyph identifier of the respective glyph and a Unicode code point assigned to the respective glyph, and the entry in the contour table comprises the glyph identifier of the respective glyph and a contour definition for the respective glyph; and
generating, by the processor, an electronic document for the textual content based on the plurality of glyphs and the font file.

2. The method of claim 1, wherein receiving the image comprises scanning a page of the source document.

3. The method of claim 1, wherein adding the entry for the respective glyph to the advance table comprises:
determining that the advance table does not include an entry for another glyph that has the same advance value and a shape identifier as the respective glyph; and
assigning a Unicode code point to the respective glyph.

4. The method of claim 1, further comprising:
determining that the advance table already includes an entry for another glyph that has the same advance value and a shape identifier as the respective glyph; and
associating the respective glyph with a Unicode code point assigned to the other glyph without adding the entry to the advance table and the mapping table.

5. The method of claim 1, wherein the font file is an OpenType font file, and the method further comprises:
identifying distinct shapes of the plurality of glyphs;
adding a subroutine for drawing each distinct shape to a compact font format (CFF) table; and
replacing contour definitions of glyphs in the contour table with references to subroutines for drawing corresponding shapes.

6. The method of claim 1, wherein the font file is a TrueType font file, and the method further comprises:
identifying distinct shapes of the plurality of glyphs;
defining a first glyph of a distinct shape as a simple glyph in a glyph table; and
defining, in the glyph table, each subsequent glyph of the distinct shape as a compound glyph including the simple glyph as a component glyph.

7. A method comprising:
receiving, by a processor, a plurality of glyphs associated with textual content;
determining, by the processor, a respective set of font characteristics for each of the plurality of glyphs, wherein the set of font characteristics comprises a corresponding advance value for each of the plurality of glyphs, the corresponding advance value being based on a distance between a respective glyph and a next glyph following the respective glyph;
storing, by the processor, the respective set of font characteristics for each of the plurality of glyphs in a font file, wherein storing the respective set of font characteristics comprises storing the corresponding advance value for each of the plurality of glyphs in an advance table of the font file; and generating, by the processor, an electronic document for the textual content based on the plurality of glyphs and the font file.

8. The method of claim 7, wherein receiving the plurality of glyphs comprises:
   receiving an image of at least a portion of a source document comprising the textual content; and
   segmenting the image into a plurality of character blocks, each character block comprising a respective glyph of the plurality of glyphs.

9. The method of claim 7, wherein storing the corresponding advance value for each of the plurality of glyphs in the advance table comprises:
   for each glyph of the plurality of glyphs, determining the corresponding advance value for the respective glyph using a width of the respective glyph and the distance between the respective glyph and the next glyph; and
   adding an entry for the respective glyph to the advance table of the font file, wherein the entry in the advance table comprises a glyph identifier of the respective glyph and the corresponding advance value of the respective glyph.

10. The method of claim 9, wherein storing the respective set of font characteristics further comprises:
    adding an entry for the respective glyph to a mapping table of the font file, wherein the entry in the mapping table comprises a Unicode code point assigned to the respective glyph and the glyph identifier of the respective glyph; and
    adding an entry for the respective glyph to a contour table of the font file, wherein the entry in the contour table comprises the glyph identifier of the respective glyph and a contour definition for the respective glyph.

11. The method of claim 10, wherein the Unicode code point is assigned to the respective glyph using a Private Use Area of Unicode.

12. The method of claim 9, wherein storing the corresponding advance value for each of the plurality of glyphs in the advance table further comprises:
    determining that the advance table does not include an entry for another glyph that has the same advance value and a shape identifier as the respective glyph; and
    assigning a Unicode code point to the respective glyph.

13. The method of claim 9, further comprising:
    determining that the advance table already includes an entry for another glyph that has the same advance value and a shape identifier as the respective glyph; and
    associating the respective glyph with a Unicode code point assigned to the other glyph without adding the entry to the advance table and a mapping table.

14. The method of claim 9, wherein the font file is an OpenType font file, and the method further comprises:
    identifying distinct shapes of the plurality of glyphs;
    adding a respective subroutine for drawing each distinct shape to a compact font format (CFF) table; and
    replacing contour definitions of glyphs in the CFF table with references to subroutines for drawing corresponding shapes.

15. The method of claim 9, wherein the font file is a TrueType font file, and the method further comprises:
    identifying distinct shapes of the plurality of glyphs;
    defining a first glyph of a distinct shape as a simple glyph in a glyph table; and
    defining, in the glyph table, each subsequent glyph of the distinct shape as a respective compound glyph including the simple glyph as a component glyph.

16. A non-transitory computer-readable medium having instructions encoded thereon which, when executed by a processor, cause the processor to perform operations comprising:
    receiving, by the processor, a plurality of glyphs associated with textual content;
    determining, by the processor, a respective set of font characteristics for each of the plurality of glyphs, wherein the set of font characteristics comprises a corresponding advance value for each of the plurality of glyphs, the corresponding advance value being based on a distance between a respective glyph and a next glyph following the respective glyph;
    storing, by the processor, the respective set of font characteristics for each of the plurality of glyphs in a font file, wherein storing the respective set of font characteristics comprises storing the corresponding advance value for each of the plurality of glyphs in an advance table of the font file; and
    generating, by the processor, an electronic document for the textual content based on the plurality of glyphs and the font file.

17. The non-transitory computer-readable medium of claim 16, wherein receiving the plurality of glyphs comprises:
    receiving an image of at least a portion of a source document comprising the textual content; and
    segmenting the image into a plurality of character blocks, each character block comprising a respective glyph of the plurality of glyphs.

18. The non-transitory computer-readable medium of claim 16, wherein storing the corresponding advance value for each of the plurality of glyphs in the advance table comprises:
    for each glyph of the plurality of glyphs, determining the corresponding advance value for the respective glyph using a width of the respective glyph and the distance between the respective glyph and the next glyph; and
    adding an entry for the respective glyph to the advance table of the font file, wherein the entry in the advance table comprises a glyph identifier of the respective glyph and the corresponding advance value of the respective glyph.

19. The non-transitory computer-readable medium of claim 18, wherein storing the respective set of font characteristics further comprises:
    adding an entry for the respective glyph to a mapping table of the font file, wherein the entry in the mapping table comprises a Unicode code point assigned to the respective glyph and the glyph identifier of the respective glyph; and
    adding an entry for the respective glyph to a contour table of the font file, wherein the entry in the contour table comprises the glyph identifier of the respective glyph and a contour definition for the respective glyph.

20. The non-transitory computer-readable medium of claim 18, wherein storing the corresponding advance value for each of the plurality of glyphs in the advance table further comprises:
    determining that the advance table does not include an entry for another glyph that has the same advance value and a shape identifier as the respective glyph; and
    assigning a Unicode code point to the respective glyph.

21. The non-transitory computer-readable medium of claim 18, the operations further comprising:
    determining that the advance table already includes an entry for another glyph that has the same advance value and a shape identifier as the respective glyph; and associating the respective glyph with a Unicode code point assigned to the other glyph without adding the entry to the advance table and a mapping table.

* * * * *